United States Patent
Lipcsei

(12)
(10) Patent No.: US 6,459,602 B1
(45) Date of Patent: Oct. 1, 2002

(54) DC-TO-DC CONVERTER WITH IMPROVED TRANSIENT RESPONSE

(75) Inventor: Laszlo Lipcsei, San Jose, CA (US)

(73) Assignee: O2 Micro International Limited (KN)

( * ) Notice: Subject to any disclaimer, the term of this patent is extended or adjusted under 35 U.S.C. 154(b) by 0 days.

(21) Appl. No.: 09/843,200

(22) Filed: Apr. 25, 2001

Related U.S. Application Data

(60) Provisional application No. 60/244,054, filed on Oct. 26, 2000.

(51) Int. Cl.[7] ............... H02M 7/5387; H02M 7/44; G05F 1/40
(52) U.S. Cl. .............. 363/132; 363/98; 323/288
(58) Field of Search ............... 363/132, 131, 363/97, 98, 72, 16, 17; 323/282, 283, 284

(56) References Cited

U.S. PATENT DOCUMENTS

| | | | |
|---|---|---|---|
| 4,748,550 | * 5/1988 | Okado | 363/98 |
| 4,800,476 | * 1/1989 | Harada et al. | 363/16 |
| 5,008,846 | 4/1991 | Inoue | 364/707 |
| 5,019,996 | 5/1991 | Lee | 364/483 |
| 5,176,523 | 1/1993 | Lai | 439/64 |
| 5,396,635 | 3/1995 | Fung | 395/800 |
| 5,408,150 | * 4/1995 | Wilcox | 327/108 |
| 5,568,044 | * 10/1996 | Bittner | 323/272 |
| 5,627,460 | * 5/1997 | Bazinet et al. | 323/288 |
| 5,630,090 | 5/1997 | Keehan et al. | 395/433 |
| 5,657,217 | * 8/1997 | Watanabe et al. | 363/71 |
| 5,716,221 | 2/1998 | Kantner | 439/64 |
| 5,757,634 | * 5/1998 | Ferens | 363/72 |
| 5,763,862 | 6/1998 | Jachimowicz et al. | 235/380 |
| 5,808,883 | * 9/1998 | Hawkes | 363/59 |
| 5,809,312 | 9/1998 | Ansel et al. | 395/750.01 |
| 5,878,264 | 3/1999 | Ebrahim | 395/750.05 |
| 5,936,226 | 8/1999 | Aucsmith | 235/492 |
| 5,959,442 | * 9/1999 | Hallberg et al. | 323/282 |
| 5,963,464 | 10/1999 | Dell et al. | 365/52 |
| 5,964,597 | 10/1999 | Hirata et al. | 439/108 |
| 5,975,959 | 11/1999 | Joly | 439/630 |
| 5,986,891 | 11/1999 | Sugimoto | 361/737 |
| 6,015,092 | 1/2000 | Postlewaite et al. | 235/486 |
| 6,085,327 | 7/2000 | Seng et al. | 713/300 |
| 6,215,290 | * 4/2001 | Yang et al. | 323/282 |
| 6,222,745 | * 4/2001 | Amaro et al. | 363/65 |

\* cited by examiner

*Primary Examiner*—Rajnikant B. Patel
(74) *Attorney, Agent, or Firm*—Grossman, Tucker, Perreault & Pfleger, PLLC

(57) ABSTRACT

A DC to DC converter includes a comparator, a driver, and a pair of switches. The comparator compares the output voltage with a reference voltage signal and generates a PWM signal. The driver drives the switches so as to force the output voltage to follow the reference signal. In a multiphase architecture, two or more such converter circuits are incorporated to minimize the output voltage ripple and further reduce the recovery time. In a two-phase architecture, two reference signals are phase-shifted by 180 degrees. In an N-phase architecture, the reference signals are phase-shifted by 360/N degrees.

23 Claims, 7 Drawing Sheets

1

DC-TO-DC CONVERTER WITH IMPROVED TRANSIENT RESPONSE

CROSS-REFERENCE TO RELATED APPLICATIONS

This application is related to U.S. provisional patent application Ser. No. 60/244,054, filed on Oct. 26, 2000.

TECHNICAL FIELD

The invention generally relates to voltage converters, and more particularly to a direct-current (DC) to direct-current (DC) converter that exhibits improved transient response.

BACKGROUND OF THE INVENTION

Direct-current (DC) to direct-current (DC) converters are well-known in the field of electronics. Such circuitry or devices are typically employed to convert from one DC voltage level to another DC voltage level. They are used in a variety of environments. For instance, several kinds of such converters are used to supply microprocessor core voltage. One kind of such converters is referred to as a fixed frequency converter, also known as pulse-width modulated (PWM) converter. A PWM converter includes voltage mode converters and current mode converters.

A voltage mode PWM converter includes a control loop that contains an error amplifier, a PWM comparator, and one or more drivers, usually coupled with a synchronous rectifier to improve performance. The output voltage is compared with a reference voltage by the error amplifier. The PWM comparator receives the output of the error amplifier as its first input and receives a saw-tooth or a triangle signal as its second input. The PWM comparator's output is a PWM signal that is amplified by the drivers driving the power switches. The advantages of this kind of converters are simplicity in architecture and high precision. Its major disadvantage is its slow response to load transients because of the compensation needed on the error amplifier.

A current mode PWM converter includes two control loops—an inner current loop and an outer voltage loop which controls the inner current loop. The inner current loop consists of a current amplifier, a comparator that uses as inputs an error voltage from the outer voltage loop and the output of the current amplifier, a flip-flop that is set every time by the clock signal and reset by the output of the comparator, and one or more drivers. The outer voltage loop includes a voltage error amplifier that compares the output voltage with a reference voltage. The output of the error amplifier is a reference for the inner current loop. The advantages of this kind of converters include high stability, high precision, and suitability for multiphase architecture. Its major disadvantage is its slow response to load transients due to the compensation of the outer voltage loop.

Another kind of DC to DC converter is referred to as a constant on time converter, also known as pulse-frequency modulated (PFM) converter. A PFM converter consists of a control loop which contains an error amplifier, a comparator, and one or more drivers, usually coupled with a synchronous rectifier to improve performance. The output voltage is compared with a reference voltage by the error amplifier. The output of the error amplifier is compared with a reference to obtain a triggering signal for a one-shot that sets the constant on time. The advantages of this kind of converters include simplicity in architecture, high precision, and a comparative fast response to load transients. Its major disadvantages are non-fixed frequency and non-suitability for multiphase applications.

Another kind of DC to DC converter is referred to as a hysteretic converter, including voltage mode hysteretic converter and current mode hysteretic converter. A voltage mode hysteretic converter includes a control loop, which contains a hysteretic comparator, and one or more drivers, usually coupled with a synchronous rectifier to improve performance. The output voltage is compared with a reference voltage by the comparator that has a hysteretic. The output of the comparator is used as input for the drivers. The advantages of this kind of converters include simplicity in architecture, high precision, and fast transient response to load steps. Its disadvantages are non-fixed frequency and non-suitability for multiphase architecture.

A current mode hysteretic converter includes a control loop that contains a voltage error amplifier, a hysteretic current comparator, and one or more drivers, usually coupled with a synchronous rectifier to improve performance. The output voltage is compared with a reference voltage by the voltage error amplifier that generates an offset signal for the current comparator. The output of the comparator is used as input for the drivers. The advantages of this kind of converters include simplicity in architecture and high precision. Its disadvantages include slow transient response to load steps, non-fixed frequency, and non-suitability for multiphase architecture.

What is desired is a simpler and relatively cost effective solution for DC-to-DC conversion with fast response to load transients, high precision, fixed frequency, and suitability for multiphase applications.

SUMMARY OF THE INVENTION

Briefly, in accordance with one embodiment of the invention, a DC to DC converter circuit includes a comparator, a driver, and a pair of switches. The comparator compares the output voltage with a reference voltage signal and generates a PWM signal. The driver uses the PWM signal to drive the switches so as to force the output voltage at its pre-established value.

In accordance with another embodiment, two or more such converter circuits are incorporated in a multiphase architecture so as to minimize the output voltage ripple and further reduce the recovery time. In a two-phase architecture, two reference signals are shifted with 180 degrees. In an N-phase architecture, the reference signals are shifted with 360/N degrees. The advantages of the DC-to-DC converter according to this invention is numerous. For example:

Very fast response to heavy load transients. When a load is varied, for example, from 0 to 20 Amperes, the output voltage may recover its steady state in about 10 $\mu s$.

Reduced output voltage ripple in multiple phased converter circuits. The DC-to-DC converter maintains the output voltage with very small variation of the duty cycle even on heavy loads.

DETAILED DESCRIPTION OF THE INVENTION

Figure 1:
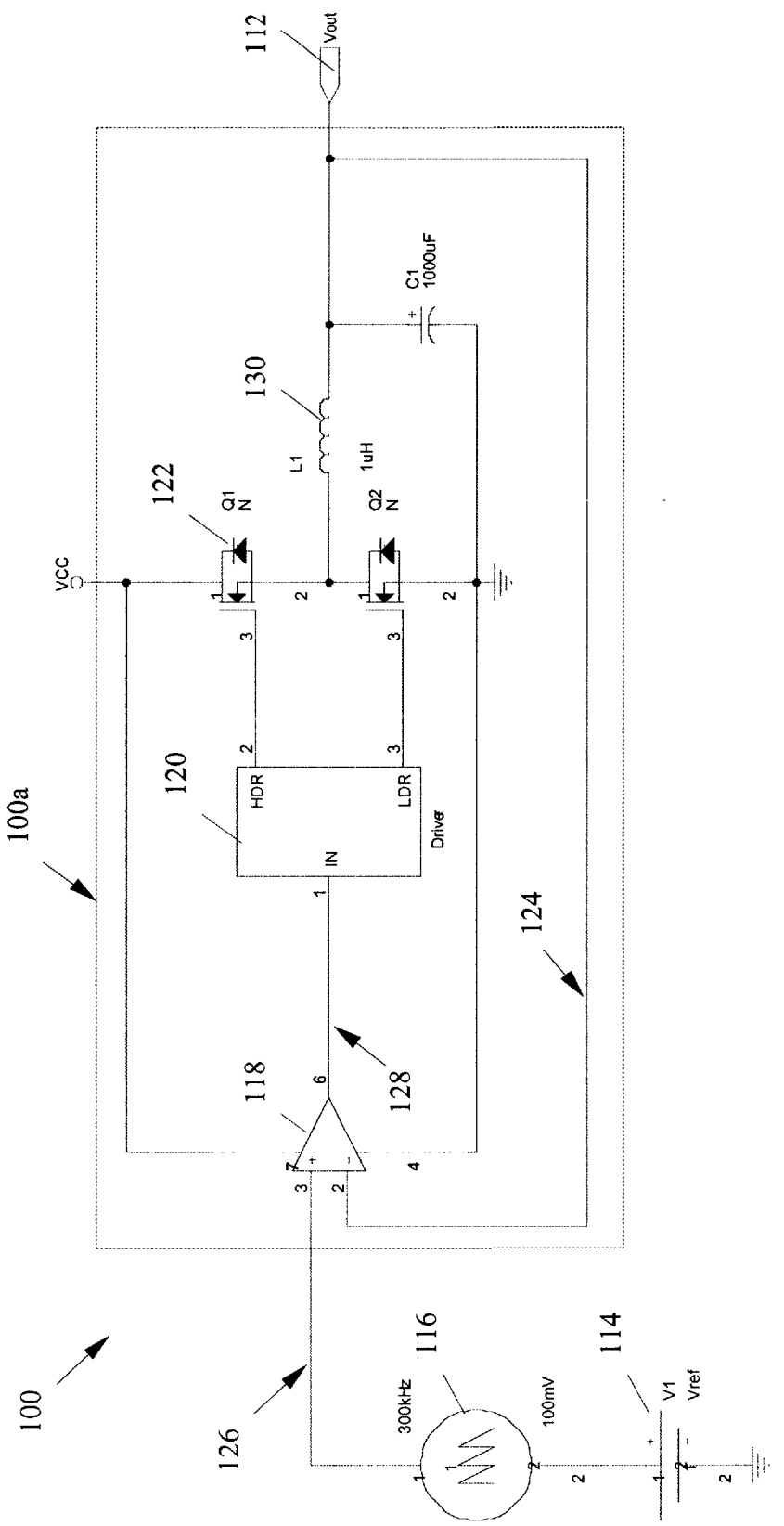
FIG. 1 is a circuit diagram that illustrates an embodiment of a fast transient response DC-DC converter according to the invention.

FIG. 1 is a circuit diagram that illustrates a fast transient response DC-to-DC converter 100 according to the invention. Generally, the DC-to-DC converter 100 stabilizes output voltage $V_{out}$ 112 according to the reference signal at the input of the comparator. During a transient, the output load is in the process of switching from one DC state to another. The DC-to-DC converter 100 effectively reduces recovery time from a transient by modifying duty cycle in order to drive the $V_{out}$ 112 to the desired steady state.

The DC-to-DC converter 100 uses a reference DC voltage source $V_{ref}$ 114, a reference signal generator 116, a comparator 118, a driver 120, and a pair of switches 122. The signal generator 116 generates a reference signal 126, which is preferably a 300 kHz saw-tooth signal, or alternatively, any shape of periodic signal such as a triangular signal or a sinus signal, with a DC offset determined by the DC voltage generated by $V_{ref}$ 114. The reference signal 126 is received by the comparator 118 as its first input. Through a feedback loop 124, the output voltage $V_{out}$ 112 is received by the comparator 118 as its second input. The comparator 118 compares the $V_{out}$ 112 with the reference signal 126, and generates a PWM signal 128 with a duty cycle determining an increase or decrease in $V_{out}$ 112. Further, the comparator 118 forces $V_{out}$ 112 is to follow the reference signal 126 by increasing or decreasing the pulse width of its output PWM signal 128 if $V_{out}$ 112 is lower or higher than signal 126 respectively. Specifically, the driver 120 receives the PWM signal 128 as its input and drives the switches 122, which are preferably implemented as Metal Oxide Semiconductor Field Effect Transistors (MOSFETs), high and low alternatively to control the $V_{out}$ 112. Preferably, as a result, $V_{out}$ 112 approximates $V_{ref}$ and is maintained within the limits of the reference signal 126. For example, where the reference signal generator 116 generates a sawtooth reference signal 126 with peak to peak sawtooth fluctuations of 100 mV at a particular DC $V_{ref}$ voltage, $V_{ref}-50$ mV$<V_{out}<V_{ref}+50$ mV. Additionally, a LC low pass filter is coupled in series with the output load ($V_{out}$) 112. The inductance of the inductor 130 in the low pass filter should be kept as small as possible in order to reduce the recovery time for a transient of the load.

Figure 2:
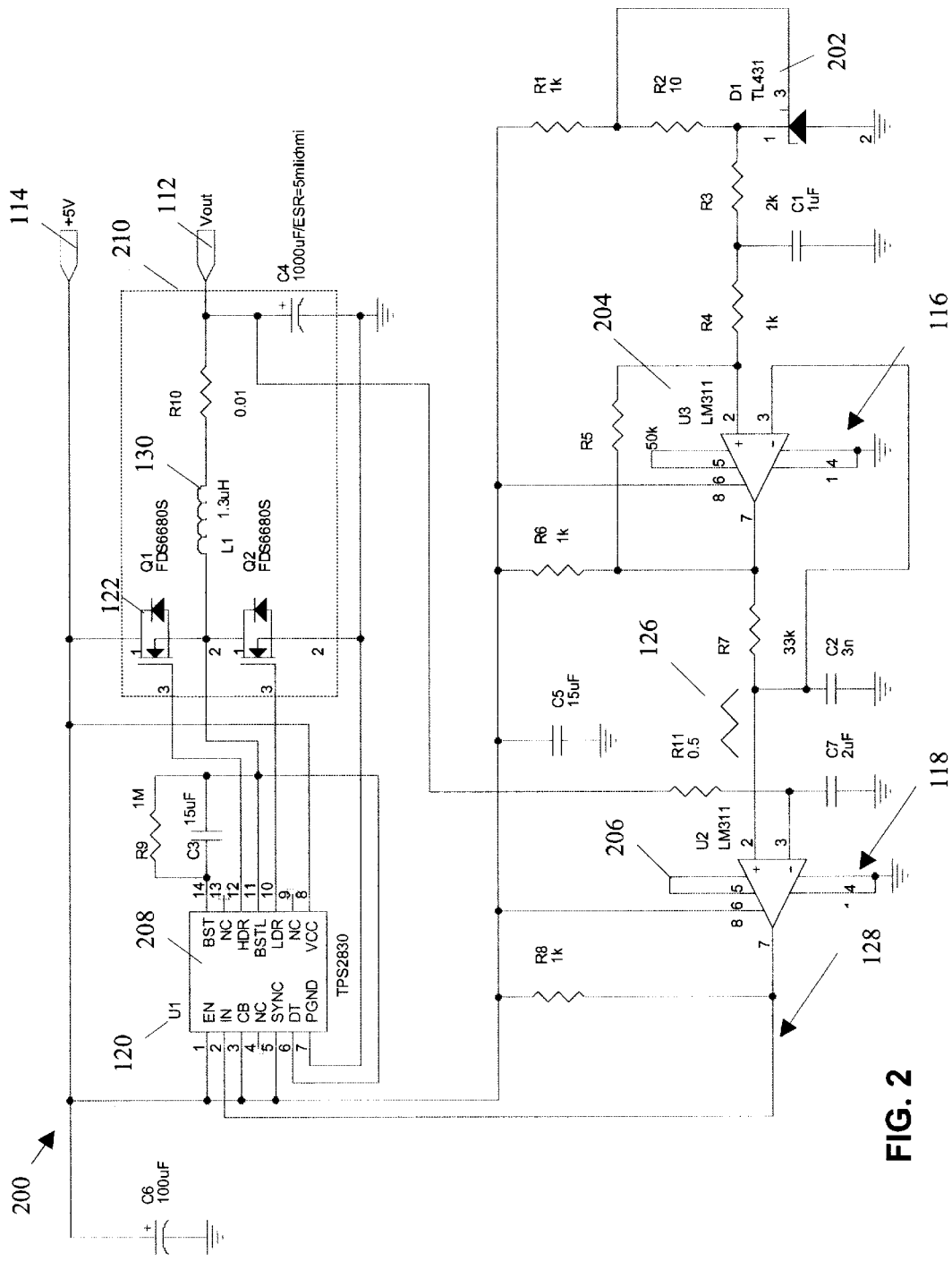
FIG. 2 is a circuit diagram that illustrates an exemplary application of the DC-to-DC converter of FIG. 1.

FIG. 2 provides an exemplary application circuit 200 illustrating an application of the DC to DC converter circuit 100 of FIG. 1. The circuit 200 uses a reference voltage generator built with, for example, D1(TL431) 202, compensating for the varying of input voltage 114 to ensure the generation by comparator 118 of a PWM signal 128 which regulates the output voltage $V_{out}$ in accordance with the reference voltage as described above. A ramp generator 116, generating a triangular signal 126 with peak to peak amplitude of approximately 100 mV, is built with part U3 (LM311) 204. The comparator 118 described above, which receives as inputs the output voltage $V_{out}$ 112 and the triangular signal 126 and generates a PWM signal 128, is built with U2 (LM311) 206. The driver 120 in the exemplary application is built with U1 (TPS2830) 208. Finally, a power block 210 consisting of MOSFETs Q1 and Q2, 122, inductor L1, 130, resistor R10, and capacitor C4, drives the output voltage $V_{out}$ 112. This DC to DC converter circuit provides for improved recovery time of a transient of the load. Note that this invention includes but is not limited by the components and circuit of the application schematic of FIG. 2.

Alternative embodiments of the invention may include two or more converter circuits 100 in a multiphase architecture, wherein the angle of the phase shifting between two circuits depends on the number of phases used. For example, in a four-phase architecture, the shifting angle is 90 degrees. A concern with the multiphase architecture is the undesired current flow between two phases. For instance, when a load is applied on the output, if one phase delivers much more current than the other to the load, the conversion efficiency will be severely affected. The problem is similar with putting in parallel two, voltages sources. If the two voltage sources are different, a current will flow between them. To solve this problem in a multiphase DC-to-DC converter, a current balancing mechanism is necessary. For example, in a two phase DC-to-DC converter, a current balancing block is used to adjust the output voltage of the second phase to be identical with the output voltage of the first phase. By using current sense resistors, the current information is available to the current balancing block that will generate an offset voltage used to adjust the output voltage of the second phase. There are two options to execute the current balancing mechanism: (1) by modifying the reference voltage for the second phase; or (2) by modifying the feedback voltage for the second phase.

Figure 3:
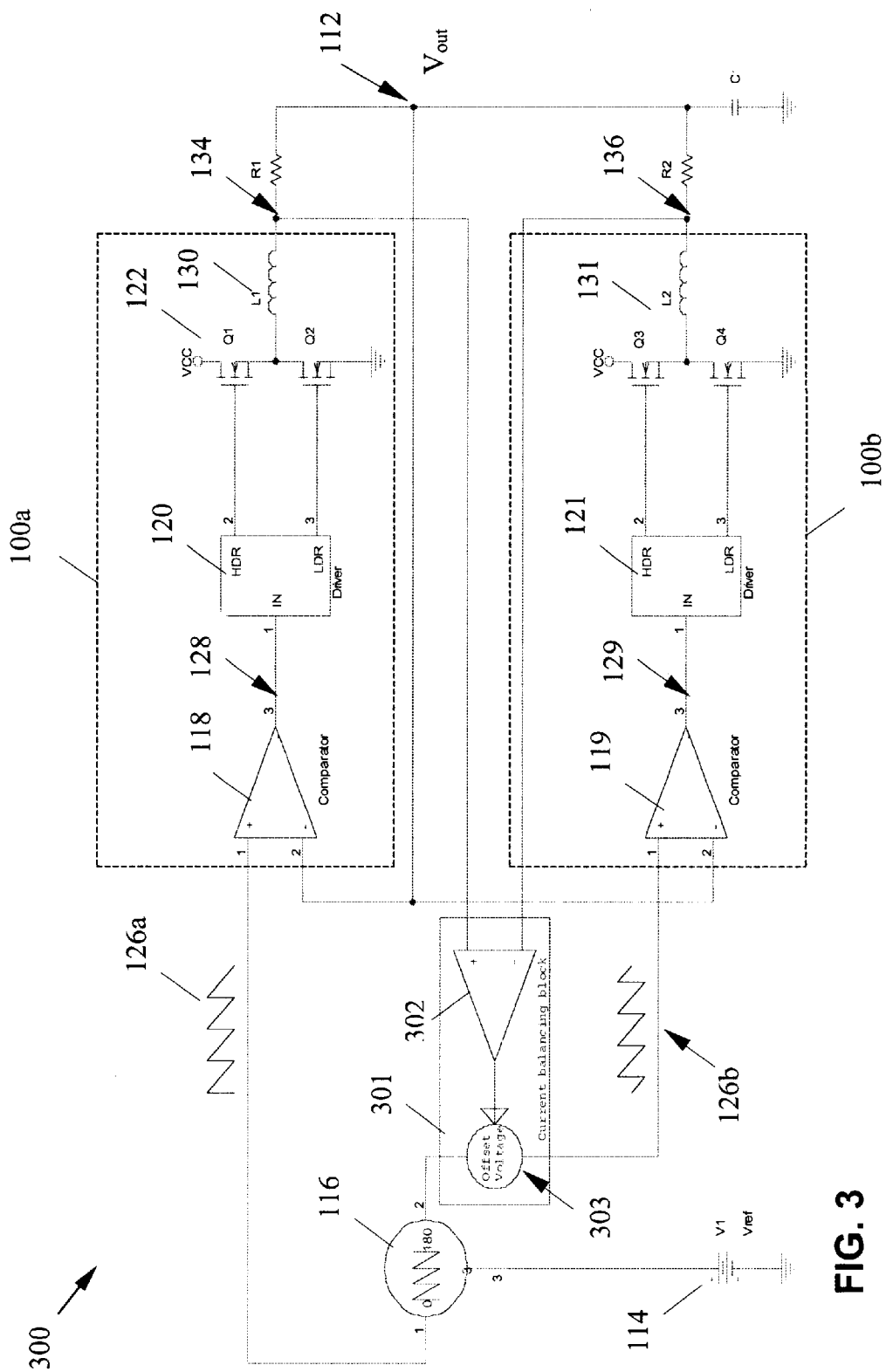
FIG. 3 is a circuit diagram that illustrates an embodiment of a two-phase DC-to-DC converter which is coupled with a current balancing block that acts on reference signal side of the second phase.

Referring to FIG. 3, illustrated is an embodiment of a two-phase DC-to-DC converter 300 with a current balancing block that acts on reference signal of the second phase. The first phase 100a establishes the output voltage 112 depending on the reference signal 126a applied on the input of the comparator 118. The current balancing block 301 shifts the DC value of the reference signal 116 for the second phase 100b to obtain the same current magnitude delivered by each phase. Assuming the current through the first phase 100a is of a higher value than the current through the second phase 100b, the voltage on the non-inverting input of the error amplifier 302 is higher than the voltage on the inverting input. The error amplifier 302 acts to reduce the value of the offset voltage 303 and thus the DC values of the reference voltage for the second phase 100b increases. Accordingly, the duty cycle of the second phase increases. Consequently, the second phase delivers a current with higher value than before. When the currents delivered by each phase are equal, the offset voltage 303 is maintained at that value to keep a current balance.

Figure 4:
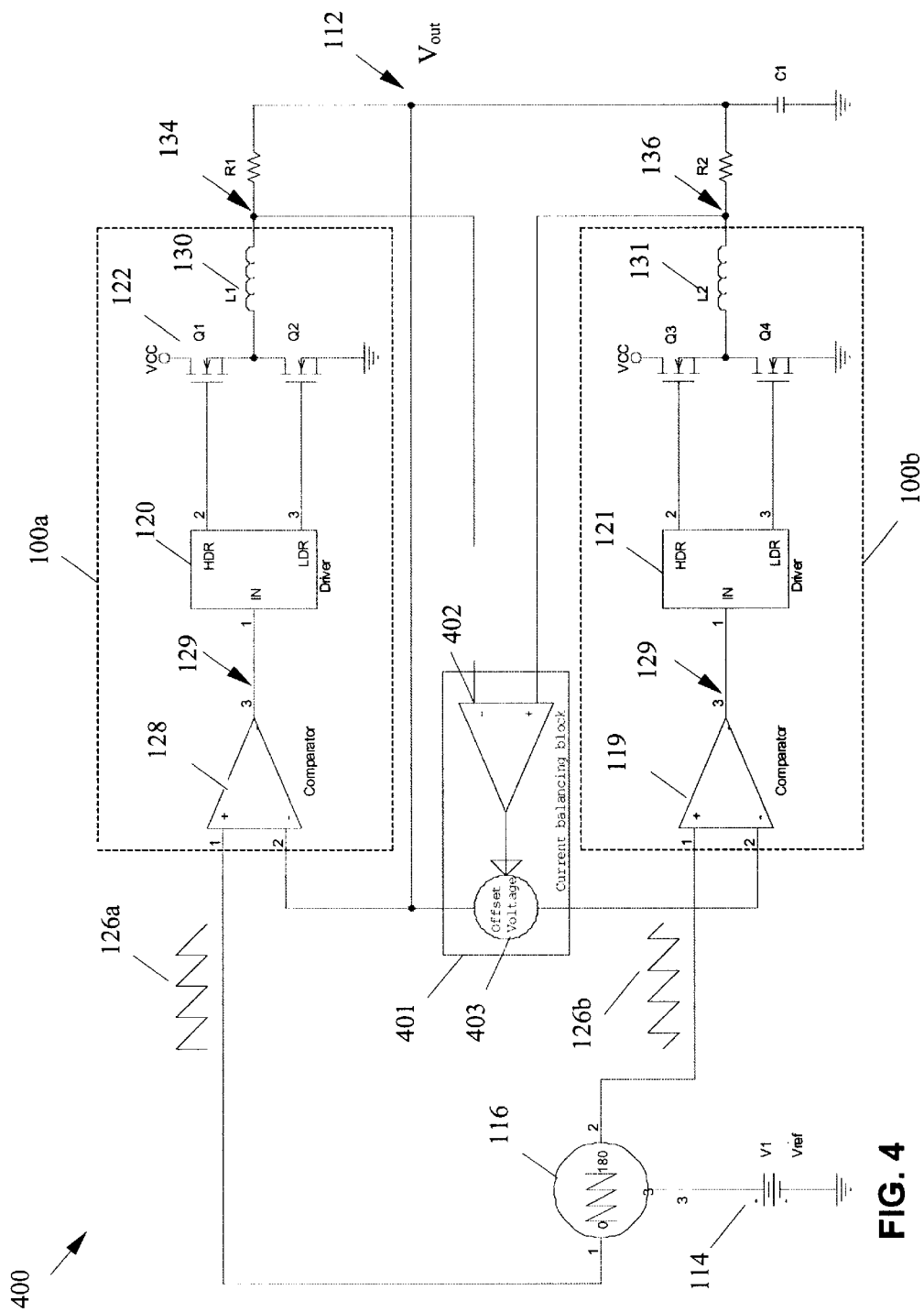
FIG. 4 is a circuit diagram that illustrates another embodiment of a two-phase DC-to-DC converter which is coupled with a current balancing block that acts on feedback side of the second phase.

Referring to FIG. 4, illustrated is another embodiment of a two-phase DC-to-DC converter 400 with a current balancing block that acts on feedback side of the second phase. The first phase 100a establishes the output voltage $V_{out}$ 112 depending on the reference signal 126a applied on the input of the comparator 128. The current balancing block 401 shifts the DC value of the feedback voltage for the second phase 100b to obtain the same current magnitude delivered by each phase. Assuming the current through the first phase 100a is of a value higher than the current through the second phase 100b, the voltage on the inverting input of the error amplifier 402 is higher than the voltage on the non-inverting input. The error amplifier 402 acts to increase the value of the offset voltage 403 and thus the DC value of the feedback voltage for the second phase 100b decreases. Accordingly, the duty cycle of the second phase 100b increases. Consequently, the second phase 100b delivers a current with a higher value than before. When the currents delivered by each phase are equal, the offset voltage 403 is maintained at that value to keep a current balance. Note that the inverting and non-inverting inputs of the current balancing block in FIG. 4 is reversed than in FIG. 3 because the current balancing block in FIG. 4 is acting on the feedback voltage.

The main advantage of the current balancing mechanism used in the converters illustrated in FIG. 3 and FIG. 4 is that when alteration of the load generates a transient, both phases act to recover the output voltage to its steady state. Because the behavior of each phase in transient is almost the same (only minor differences exist due to the spreading of the values of components used), the current balancing circuit only needs to correct slight differences modifying a little bit of the offset voltage on reference side as in FIG. 3 or feedback side as in FIG. 4 to balance the currents for the new steady state.

Note that both types of current balancing methods could be used in a multiphase architecture where the current balancing block has as inputs the current information from each N phase and the output voltage and generates the offset voltages for phase 2 to N to balance the currents with the current on the first phase.

Figure 5A:
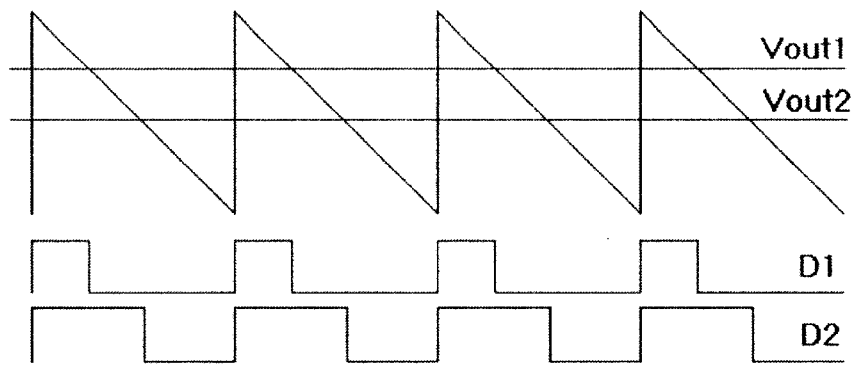
FIG. 5A is a graphical diagram showing the variation of the output voltage with the input voltage of the DC-to-DC converter.

Referring to FIG. 5A, illustrated is a diagram showing the variation of the output voltage with the input voltage. For a certain input voltage $V_{in}$, because the reference signal is constant, the duty cycle will be $D_1=V_{out}1/V_{in}$. This means that the voltage $V_{out}1$ crosses the reference signal at such a value that the duty cycle is obtained. If the input voltage decrease, for example, to $k*V_{in}$ where k<1, the output voltage decreases in order to increase duty cycle, because the new value of the duty cycle is $D_2=V_{out}2/k*V_{in}$. Therefore, the output voltage decreases with a value of $(D_2-D_1)*$(Amplitude of saw tooth reference signal). Even for very low amplitudes of the reference signal, because the input voltage may vary between large limits, the output voltage varies with the input voltage.

Figure 5B:
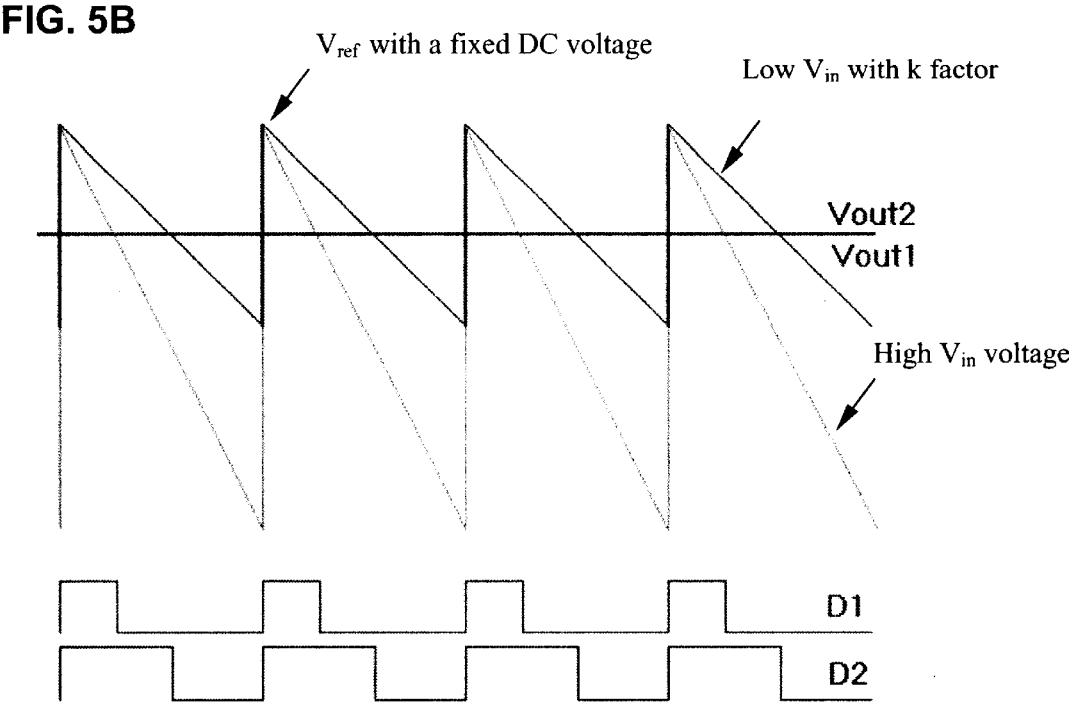
FIG. 5B is a graphical diagram illustrating a method to compensate the output voltage with the input voltage.

Referring to FIG. 5B, illustrated is a method to compensate the output voltage with a varying input voltage. One way to prevent the output voltage from varying with the input voltage is to generate a saw tooth signal with an amplitude proportional with the input voltage and its top to be maintained at a fixed DC voltage level $V_{ref}$. This means that for the input voltage equal with $V_{in}$, the output voltage is $V_{out}1$ corresponding to a value where the output voltage and the saw tooth signal cross each other to obtain duty cycle $D_1=V_{out}1/V_{in}$. Therefore, if the amplitude of the saw tooth signal is $A_{sawtooth}$ and the top of it has a value $V_{ref}$, then $V_{out}1=V_{ref}-D1*A_{sawtooth}$, i.e., $V_{out}1=V_{ref}-V_{out}1*A_{sawtooth}/V_{in}$, or $V_{out}1=V_{ref}/(1+A_{sawtooth}/V_{in})$.

When the input voltage is decreasing with a k<1 factor, the amplitude of the saw tooth decreases with the same k factor maintaining the top of the saw tooth signal at $V_{ref}$. The duty cycle corresponding to the new value of input voltage is: $D_2=V_{out}2/(k*V_{in})$. However, because $V_{out}2=V_{ref}-D_2*(k*A_{sawtooth})=V_{ref}-V_{out}2*k*A_{sawtooth}(k*V_{in})$, $V_{out}2=V_{ref}/(1+A_{sawtooth}/Vin)$. This means that the $V_{out}1=V_{out}2$. Therefore, the output voltage does not vary with the input voltage.

The major advantages of the method described above include: (1) the output voltage does not depend on the input voltage; (2) the gain of the loop does not depend on the input voltage and thus the behavior of the DC-to-DC converter maintains the same for various input voltages. The gain of the loop is actually $V_{in}/A_{sawtooth}$. Because $A_{sawtooth}$ is proportional to $V_{in}$, the gain is constant; and (3) at a higher input voltage, there is a higher noise on the output due to the switching. When the saw tooth signal amplitude is increased, the PWM comparator works correctly, without generating parasitic pulses due to the noise in the output voltage.

Figure 6:
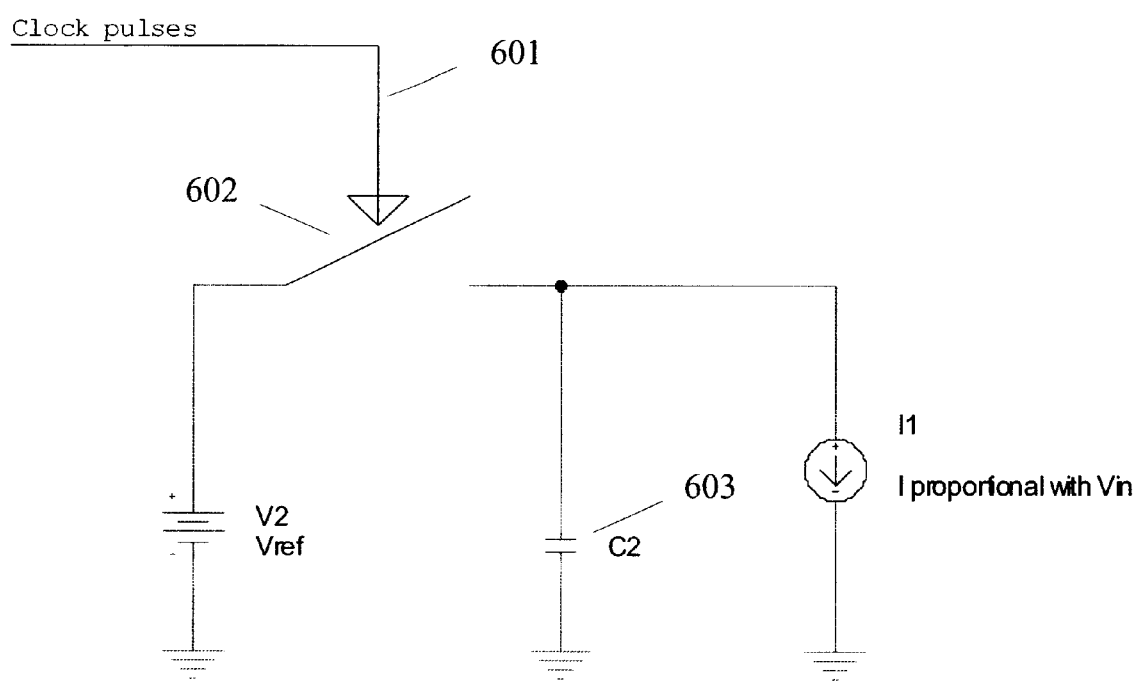
FIG. 6 is a circuit diagram illustrating the mechanism to compensate the output voltage to the varying of the input voltage.

FIG. 6 is a circuit diagram illustrating the method to compensate the output voltage to the varying of the input voltage. The clock pulses 601 close the switch 602 for a very short time which is long enough to charge capacitor 603 to $V_{ref}$ value. In this way, the top of the saw tooth signal is exactly $V_{ref}$. The switch 602 opens and the capacitor 603 is discharged with a constant current proportional to the input voltage. The elements of the circuit will be adjusted to obtain the desired amplitude of the saw tooth. This circuit compensates the output voltage to the varying of the input voltage. One application of this circuit is the case in a notebook computer where the input voltage could be the battery voltage or the adapter voltage. Adapter voltage is usually 20V where a discharged battery voltage could be as low as 8V or less. The system is required to work over the entire range.

Figure 7:
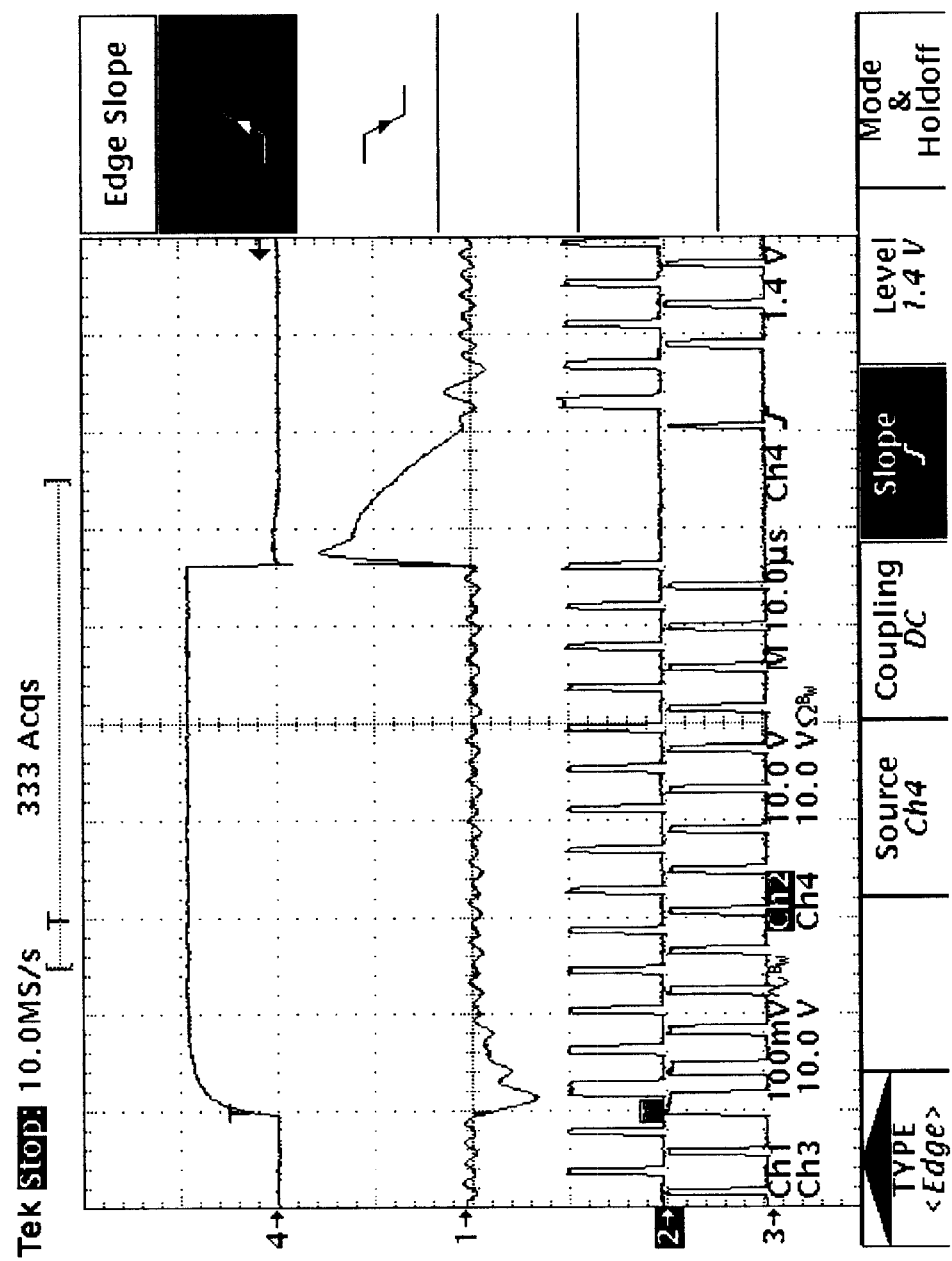
FIG. 7 is a screen capture that shows the waveforms for the output voltage, the load current, and the PWM signals when a load is applied to and removed from a two phase DC-to-DC converter.

FIG. 7 is a screen capture showing the waveforms of a transient when a load is applied to and removed from a two phase DC-to-DC converter. The load current step is 20 Amperes. CH1 is the waveform of the output voltage ($V_{out}$). CH2 is the waveform of the PWM signal of the first phase (PWM1). CH3 is the waveform of the PWM signal of the second phase (PWM2). CH4 is the waveform of_load current. When the load is applied (i.e. the current increases from 0 Amperes to 20 Amperes), the $V_{out}$ drops. Because the converter has an increased duty cycle, the output voltage returns to its steady state after a very short time (the transient response of the converter is about 100 ns that allows recovery times below 10 $\mu s$). When the load is removed, the converter acts to reduce duty cycle to recover $V_{out}$. As shown in FIG. 7, each phase modifies its own PWM in order to recover $V_{out}$ from the transient condition. Therefore, when a multiphase architecture is used, the transient on $V_{out}$ will be recovered much faster depending on the number of phases.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

What is claimed is:

1. A DC to DC converter circuit, comprising:
   a comparator that is electrically coupled in said converter circuit so as to compare an output voltage of said converter circuit with a periodic reference signal having a DC offset determined by a DC reference voltage and generate a pulse width modulated signal;
   a driver that is electrically coupled to said comparator so as to use said pulse width modulated signal as its input and drive a pair of switches, one high, one low, which alternatively control a level of said output voltage; and
   a low pass filter that is electrically coupled to an output of said pair of switches so as to reduce noise of said output voltage;

wherein said comparator forces said output voltage at a pre-established value by increasing or decreasing the pulse width of said pulse width modulated signal when said output voltage is lower or higher than said pre-established value.

2. The DC to DC converter circuit of claim 1, wherein said reference signal is generated by a reference signal generator that is coupled to a reference DC voltage source.

3. The DC to DC converter circuit of claim 2, wherein said reference signal is a periodic signal of any shape with a DC offset determined by a DC voltage generated by said reference DC voltage source.

4. The DC to DC converter circuit of claim 1, wherein each of said switches comprises a metal oxide semiconductor field effect transistor.

5. A two-phase DC to DC converter circuit, comprising:
  a first phase circuit and a second phase circuit which are electrically coupled to each other;
  wherein said first phase circuit comprises:
    a first comparator which is electrically coupled in said two-phase DC to DC converter circuit so as to compare an output voltage of said first phase circuit with a first reference signal and generate a first pulse width modulated signal; and
    a first driver which is electrically coupled to said first comparator so as to use said first pulse width modulated signal as its input and drive a first pair of switches, one high, one low, which alternatively control a level of said output voltage of said first phase circuit;
    wherein said first comparator forces said output voltage of said first phase circuit at a first pre-established value by increasing or decreasing the pulse width of said first pulse width modulated signal when said output voltage of said first phase circuit is lower or higher than said first pre-established value; and
  wherein said second phase circuit comprises:
    a second comparator which is electrically coupled in said two-phase DC to DC converter circuit so as to compare an output voltage of said second phase circuit with a second reference signal and generate a second pulse width modulated signal; and
    a second driver which is electrically coupled to said second comparator so as to use said second pulse width modulated signal as its input and drive a second pair of switches, one high, one low, which alternatively control the level of said output voltage; and
    wherein said second comparator forces said output voltage of said second phase circuit at a second pre-established value by increasing or decreasing the pulse width of said second pulse width modulated signal when said output voltage of said second phase circuit is lower or higher than said second pre-established value; and
  wherein said first reference signal and said second reference signal are shifted in phase by 180 degrees to each other.

6. The two-phase DC to DC converter circuit of claim 5, further comprising:
  a current balancing device which is electrically coupled in said two-phase DC to DC converter circuit so as to maintain the current delivered by said second phase circuit the same as the current delivered by said first phase circuit by modifying a reference voltage for said second phase circuit.

7. The two-phase DC to DC converter circuit of claim 6, wherein said current balancing device comprises:
  an offset voltage, which is used to adjust an output voltage of said second phase circuit; and
  an error amplifier, which controls said offset voltage so as to change the duty cycle of said second phase circuit.

8. The two-phase DC to DC converter circuit of claim 5, further comprising.
  a current balancing device which is electrically coupled in said two-phase DC to DC converter circuit so as to maintain the current delivered by said second phase circuit the same as the current delivered by said first phase circuit by modifying a feedback voltage for said second phase circuit.

9. The two-phase DC to DC converter circuit of claim 8, wherein said current balancing device comprises:
  an offset voltage, which is used to adjust an output voltage of said second phase circuit; and
  an error amplifier, which controls said offset voltage so as to change the duty cycle of said second phase circuit.

10. The two-phase DC to DC converter circuit of claim 5, wherein said first reference signal and said second reference signal are generated by a reference signal generator which is coupled to a reference DC voltage source.

11. The two-phase DC to DC converter circuit of claim 10, wherein each of said reference signals is a periodic signal of any shape with a DC offset determined by a DC voltage generated by said reference DC voltage source.

12. The two-phase DC to DC converter circuit of claim 5, wherein each of said switches comprises a metal oxide semiconductor field effect transistor.

13. A converter circuit for a multiphase DC to DC converter circuit comprising N converter circuits which are electrically coupled together, said converter circuit comprising:
  a comparator which is electrically coupled so as to compare an output voltage of said converter circuit with a periodic reference signal having a DC offset determined by a DC reference voltage and generate a pulse width modulated signal; and
  a driver which is electrically coupled to said comparator so as to use said pulse width modulated signal as its input and drive a pair of switches, one high, one low, which alternatively control a level of said output voltage;
  wherein said comparator forces said output voltage at a pre-established value by increasing or decreasing the pulse width of said pulse width modulated signal when said output voltage is lower or higher than said pre-established value; and
  wherein each two reference signals are phase-shifted by 360/N degrees from each other.

14. A DC-to-DC converter, comprising:
  a number of conversion circuits which are electrically coupled in said converter,
  wherein each of said conversion circuits comprises:
    a comparator which is electrically coupled so as to compare an output voltage of said converter with a periodic reference signal having a DC offset determined by a DC reference voltage and generate a pulse width modulated signal; and
    a driver which is electrically coupled to said comparator so as to use said pulse width modulated signal as its input and drive a pair of switches, one high, one low, which alternatively control a level of said output voltage;

wherein said comparator forces said output voltage at a pre-established value by increasing or decreasing the pulse width of said pulse width modulated signal when said output voltage is lower or higher than said pre-established value; and wherein each two reference signals are phase-shifted from each other with a degree of 360 divided by the number of conversion circuits coupled in said converter.

15. The DC-to-DC converter of claim 14, further comprising:

a current balancing device which is electrically coupled in said multiphase DC to DC converter so as to maintain the currents delivered by all conversion circuits at a same level by modifying feedback voltages for the conversion circuits from second phase to N phase.

16. The DC-to-DC converter of claim 14, further comprising:

a current balancing device which is electrically coupled in said multiphase DC to DC converter so as to maintain the currents delivered by all conversion circuits at a same level by modifying the reference voltages for the conversion circuits from second phase to N phase.

17. A method of producing a voltage output signal, comprising the steps of:

applying a periodic reference signal having a DC offset determined by a DC reference voltage to a converter circuit to produce a voltage output signal;

comparing said reference signal with said voltage output signal;

generating a pulse width modulated signal with a duty cycle determining an increase or decrease in said output voltage signal; and forcing said voltage output signal at a pre-established value by increasing or decreasing the pulse width of said pulse width modulated signal when said output voltage signal is lower or higher than said pre-established value respectively;

wherein said converter circuit comprises:

a comparator which is electrically coupled in said converter circuit so as to compare the output voltage of said converter circuit with said reference signal and generate said pulse width modulated signal; and a driver which is electrically coupled to said comparator so as to use said pulse width modulated signal as its input and drive a pair of switches, one high, one low, which alternatively control the level of said output voltage.

18. The method of claim 17, wherein said reference signal is generated by a reference signal generator which is coupled to a reference DC voltage source.

19. The method of claim 18, wherein said reference signal is a periodic signal of any shape with a DC offset determined by a DC voltage generated by said reference DC voltage source.

20. The method of claim 17, wherein each of said switches comprises a metal oxide semiconductor field effect transistor.

21. The method of claim 17, wherein said converter circuit comprises more than two sub-systems coupled together; and wherein each of said sub-systems comprises:

a comparator which is electrically coupled so as to compare the output voltage of said converter circuit with a reference signal and generate a pulse width modulated signal; and a driver which is electrically coupled to said comparator so as to use said pulse width modulated signal as its input and drive a pair of switches, one high, one low, which alternatively control the level of said output voltage; and wherein each two reference signals are phase-shifted by 360/N degrees from each other.

22. A method for compensating an output voltage of a DC-to-DC converter with an input voltage, comprising the steps of:

generating a periodic saw tooth voltage signal having a DC offset determined by a DC reference voltage with an amplitude which is proportional to said input voltage;

maintaining the maximal voltage value of said saw tooth signal at a fixed DC voltage level; and comparing said sawtooth voltage signal with said output voltage.

23. The method of claim 21, further comprising the step of:

applying a set of clock pulses to a switch;

charging a capacitor to the maximal voltage value of said saw tooth signal while said switch is closed; and discharging said capacitor with a constant current which is proportional to said input voltage while said switch is open.

* * * * *

UNITED STATES PATENT AND TRADEMARK OFFICE
CERTIFICATE OF CORRECTION

PATENT NO.   : 6,459,602 B1
DATED        : October 1, 2002
INVENTOR(S)  : Laszlo Lipcsei It is certified that error appears in the above-identified patent and that said Letters Patent is hereby corrected as shown below:

<u>Title page,</u>
Item [73], delete the entire Assignee name and replace with -- O2Micro International Limited --.

Signed and Sealed this

Twenty-second Day of April, 2003

JAMES E. ROGAN
*Director of the United States Patent and Trademark Office*